United States Patent
Kumaki et al.

(10) Patent No.: US 10,419,521 B2
(45) Date of Patent: Sep. 17, 2019

(54) MEMORY SYSTEM (71) Applicant: Toshiba Memory Corporation, Minato-ku (JP)

(72) Inventors: Yoshinari Kumaki, Yokohama (JP); Masaki Nakagawa, Sagamihara (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 813 days.

(21) Appl. No.: 15/059,678

(22) Filed: Mar. 3, 2016

(65) Prior Publication Data

US 2016/0352809 A1 Dec. 1, 2016

Related U.S. Application Data

(60) Provisional application No. 62/167,678, filed on May 28, 2015.

(51) Int. Cl.
*H04L 29/08* (2006.01)
*G06F 3/06* (2006.01)
*H04W 8/00* (2009.01)

(52) U.S. Cl.
CPC .............. *H04L 67/06* (2013.01); *G06F 3/067* (2013.01); *G06F 3/0619* (2013.01);
(Continued)

(58) Field of Classification Search
CPC ..... G06F 2213/3804; G06F 2213/3814; G06F 3/0619; G06F 3/0643; G06F 3/067;
(Continued)

(56) References Cited

U.S. PATENT DOCUMENTS 7,904,426 B2 * 3/2011 Ikegaya ................. G06F 3/0616
707/665
7,991,734 B2 * 8/2011 Park ........................ G06F 16/00
707/610

(Continued)

FOREIGN PATENT DOCUMENTS

JP 2010-67060 3/2010
JP 2011-87202 4/2011
(Continued)

*Primary Examiner* — Oanh Duong
(74) *Attorney, Agent, or Firm* — Oblon, McClelland, Maier & Neustadt, L.L.P.

(57) ABSTRACT

According to one embodiment, there is provided a memory system including a proximity wireless interface, a memory, and a controller. The proximity wireless interface can communicate with a correspondent device. In the memory, a file having an extension is stored. The controller specifies, if device information related to an attribution of the correspondent device is received in the proximity wireless interface from the correspondent device, at least one of an extension recognizable in the correspondent device and an extension unrecognizable therein based on the device information and that performs first transmission control according to a specified result. The first transmission control includes at least one of selectively transmitting a file having the recognizable extension from the proximity wireless interface to the correspondent device and not transmitting a file having the unrecognizable extension from the proximity wireless interface to the correspondent device.

12 Claims, 6 Drawing Sheets

(52) U.S. Cl.
CPC .......... *G06F 3/0643* (2013.01); *G06F 3/0683* (2013.01); *H04W 8/005* (2013.01)

(58) Field of Classification Search
CPC . G06F 3/0683; G06K 19/07732; H04L 67/06; H04W 8/005
See application file for complete search history.

(56) References Cited

U.S. PATENT DOCUMENTS

| | | | |
|---|---|---|---|
| 8,700,849 | B2 | 4/2014 | Okubo et al. |
| 8,904,048 | B2 * | 12/2014 | Forrest, III ............ G06F 13/387 710/10 |
| 9,128,820 | B1 * | 9/2015 | Malina ................ G06F 16/1847 |
| 10,264,072 | B2 * | 4/2019 | Crofton ............... H04L 67/1097 |
| 2004/0040043 | A1 * | 2/2004 | Heo ................... H04N 21/4184 725/134 |
| 2005/0175317 | A1 * | 8/2005 | Chung ................ G11B 20/1217 386/232 |
| 2006/0033809 | A1 * | 2/2006 | Farley .................... H04M 3/428 348/14.01 |
| 2007/0013601 | A1 * | 1/2007 | Atkinson ............. G06K 19/077 343/873 |
| 2009/0292707 | A1 * | 11/2009 | Moritani ................ G06F 3/0605 |
| 2010/0169548 | A1 | 7/2010 | Kanda |
| 2011/0103214 | A1 * | 5/2011 | Yamaoka ........... G11B 7/00736 369/100 |
| 2013/0113944 | A1 | 5/2013 | Fukushima |
| 2013/0185268 | A1 * | 7/2013 | Kim .................... G06F 16/2455 707/693 |
| 2015/0326664 | A1 * | 11/2015 | Richter ................. G06Q 10/06 709/217 |
| 2017/0052943 | A1 * | 2/2017 | Owens ................. G06F 17/248 |

FOREIGN PATENT DOCUMENTS

| | | |
|---|---|---|
| JP | 2013-101436 | 5/2013 |
| KR | 20040078966 A * | 9/2004 |

* cited by examiner

MEMORY SYSTEM

CROSS-REFERENCE TO RELATED APPLICATIONS

This application is based upon and claims the benefit of priority from U.S. Provisional Application No. 62/167,678, filed on May 28, 2015; the entire contents of which are incorporated herein by reference.

FIELD

Embodiments described herein relate generally to a memory system.

BACKGROUND

As a memory system such as a memory card, there is what includes a proximity wireless interface which can communicate with a correspondent device. Here, it is preferable that a file transmitted from the proximity wireless interface to the correspondent device is an appropriate file.

DETAILED DESCRIPTION

In general, according to one embodiment, there is provided a memory system including a proximity wireless interface, a memory, and a controller. The proximity wireless interface can communicate with a correspondent device. In the memory, a file having an extension is stored. The controller specifies, if device information related to an attribution of the correspondent device is received in the proximity wireless interface from the correspondent device, at least one of an extension recognizable in the correspondent device and an extension unrecognizable therein based on the device information and that performs first transmission control according to a specified result. The first transmission control includes at least one of selectively transmitting a file having the recognizable extension from the proximity wireless interface to the correspondent device and not transmitting a file having the unrecognizable extension from the proximity wireless interface to the correspondent device.

Exemplary embodiments of a memory system will be explained below in detail with reference to the accompanying drawings. The present invention is not limited to the following embodiments.

First Embodiment

Figure 1:
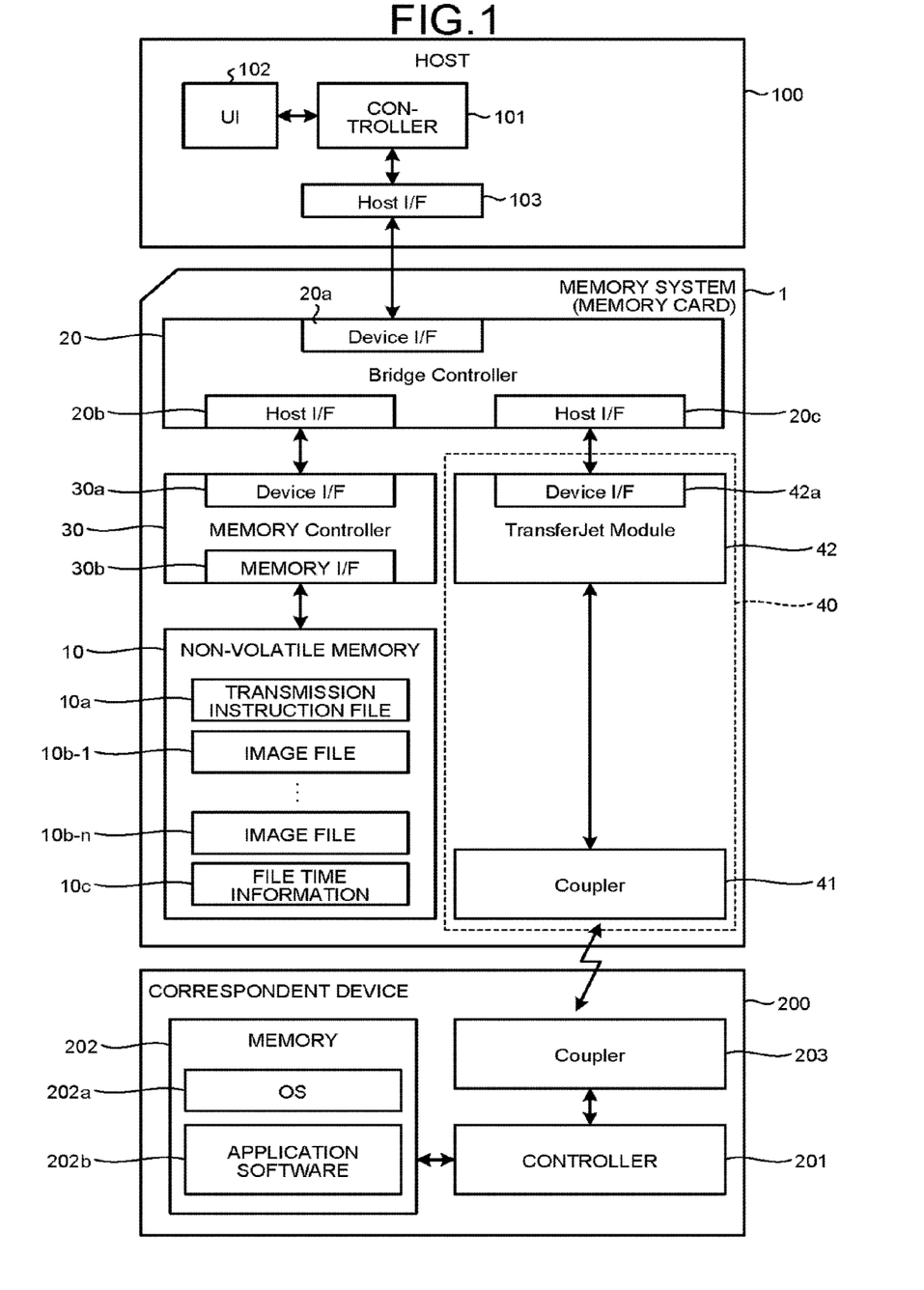
FIG. 1 is a view illustrating a configuration of a memory system according to a first embodiment.

A memory system 1 according to the first embodiment will be described with reference to FIG. 1. FIG. 1 is a view illustrating a configuration of the memory system 1.

The memory system 1 includes a non-volatile memory 10 and functions as an external storage medium with respect to a host 100. For example, the memory system 1 may be a memory card configured in a manner attachable/detachable with respect to the host 100 or may be an embedded device mounted in a chassis of the host 100. For example, the non-volatile memory 10 may be a NAND-type flash memory, an FeRAM, an MRAM, or a ReRAM.

For example, the host 100 includes a controller 101, a user interface (UI) 102, and a host interface (Host I/F) 103. When the memory system 1 is a memory card, the host 100 may include a card slot including a host interface 103. For example, the host 100 is a digital camera, a video camera, or a smartphone.

The memory system 1 performs communication (such as serial communication) with the host 100. Also, when a correspondent device 200 is in a predetermined proximity distance, the memory system 1 can communicate with the correspondent device 200 by using a proximity wireless technology. The proximity wireless technology is, for example, a technology of TransferJet™ communication.

For example, the correspondent device 200 includes a controller 201, a coupler 203, and a memory 202. In the memory 202, an OS 202a and application software 202b are stored. For example, the correspondent device 200 is a smartphone, a mobile terminal, or a personal computer.

The memory system 1 includes a bridge controller 20, a memory controller 30, and a proximity wireless interface 40 in addition to the non-volatile memory 10.

The bridge controller 20 includes a device interface (Device I/F) 20a, a host interface (Host I/F) 20b, and a host interface (Host I/F) 20c. The device interface 20a functions as a connection interface with respect to the host 100. The host interface 20b functions as a connection interface with respect to the memory controller 30. The host interface 20c functions as a connection interface with respect to the proximity wireless interface 40. That is, the bridge controller 20 includes two interfaces, which are an interface on a side of the non-volatile memory 10 and an interface on a side of the proximity wireless interface 40, and has a bridge function.

The memory controller 30 includes a device interface (Device I/F) 30a and a memory interface (memory I/F) 30b. The device interface 30a functions as a connection interface with respect to the bridge controller 20. The memory interface 30b functions as a connection interface with respect to the non-volatile memory 10.

For example, according to a write command received from the host 100 through the bridge controller 20, the memory controller 30 stores data into the non-volatile memory 10. Also, according to a read command received from the host 100 through the bridge controller 20, the memory controller 30 reads data from the non-volatile memory 10 and transmits the read data to the host 100 through the bridge controller 20. According to an erasing command received from the host 100 through the bridge controller 20, the memory controller 30 erases specified data in the non-volatile memory 10.

Note that in FIG. 1, a case where the bridge controller 20 and the memory controller 30 are configured separately has been described as an example. However, the bridge controller 20 and the memory controller 30 may be configured as an integrated controller.

Also, when the correspondent device 200 is in a predetermined proximity distance, the proximity wireless interface 40 can communicate with the correspondent device 200 by using a proximity wireless technology. The proximity wireless interface 40 includes a coupler 41 and a TransferJet module 42. The coupler 41 is a coupler to be electromagnetically coupled to the coupler 203 of the correspondent device 200. Each of the coupler 41 and the coupler 203 is configured to control a far field component and to amplify a near field component and is also configured to be electromagnetically coupled to a coupler in a predetermined proximity distance to communicate therewith.

The TransferJet module 42 includes a device interface (Device I/F) 42a. The device interface 42a functions as a connection interface with respect to the bridge controller 20. The TransferJet module 42 converts an RF signal (physical layer packet) received in the coupler into digital information (physical layer packet) and supplies the digital information to the bridge controller 20. Also, the TransferJet module 42 converts the digital information (physical layer packet), which is supplied by the bridge controller 20, into an RF signal (physical layer packet) and makes the coupler transmit the RF signal.

The bridge controller 20 performs an interface operation of a layer (connection layer and protocol conversion layer) higher than a physical layer in a proximity wireless technology (such as technology of TransferJet™ communication).

Figure 2:
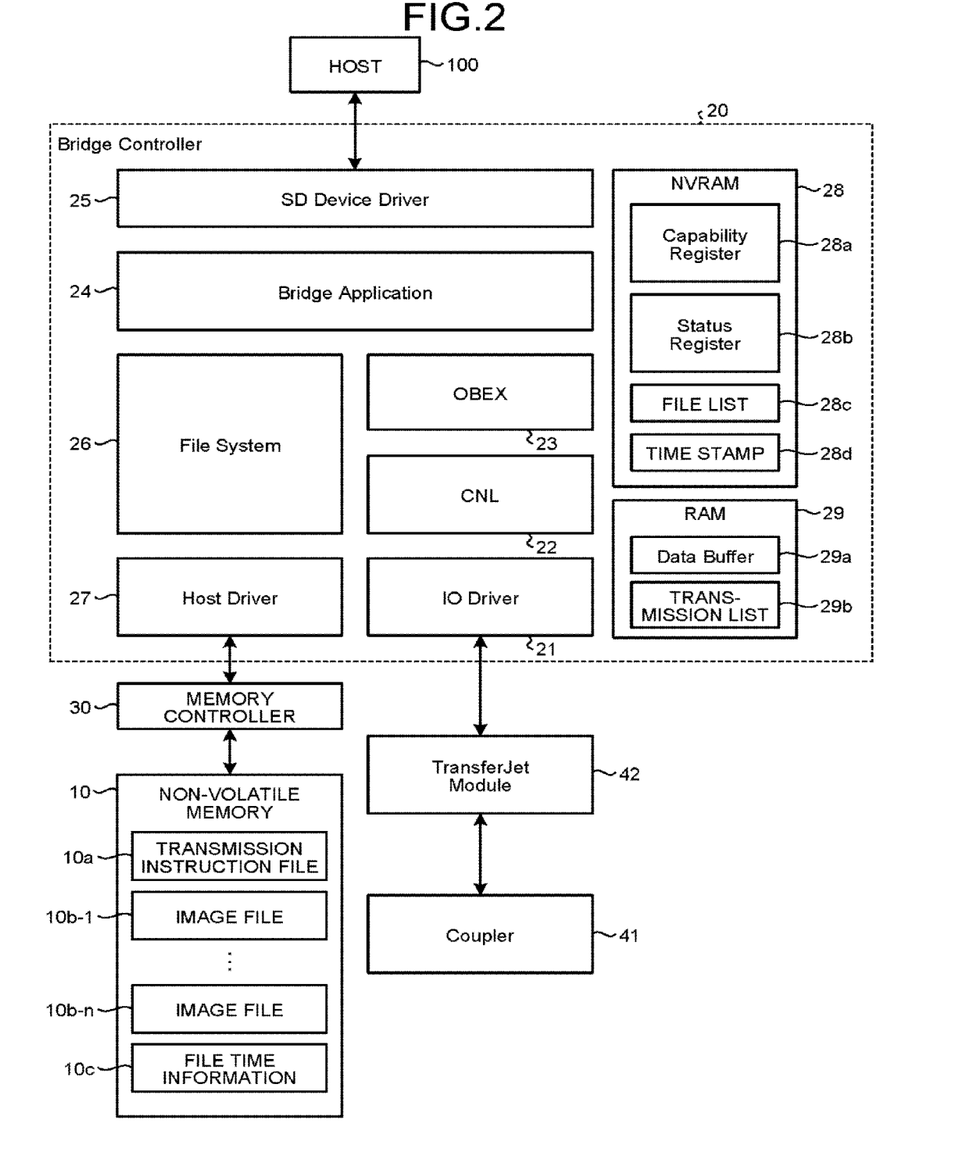
FIG. 2 is a view illustrating a configuration of a bridge controller in the first embodiment.

For example, as illustrated in FIG. 2, the bridge controller 20 includes an input/output (IO) driver 21, a connection layer (CNL) module 22, an object exchange (OBEX) module 23, a bridge application 24, an SD device driver 25, a file system 26, a host driver 27, a non-volatile RAM (NVRAM) 28, and a RAM 29. The non-volatile RAM 28 includes a capability register 28a and a status register 28b and can store a file list 28c. Reading/writing with respect to the capability register 28a, the status register 28b, and the file list 28c can be performed from the host 100 through the bridge controller 20. The RAM 29 includes a data buffer 29a. Note that FIG. 2 is a view illustrating a configuration of the bridge controller 20.

A connection layer module 22 performs protocol conversion of digital information (physical layer packet) into digital information (connection layer packet) and supplies the converted information to the object conversion module 23. The object conversion module 23 performs protocol conversion of digital information (connection layer packet) into digital information (protocol conversion layer) and supplies the converted information to the bridge application 24. The bridge application 24 transfers the protocol-converted digital information (data) to the host 100 through the SD device driver 25 or to the non-volatile memory 10 through the host driver 27 or the memory controller 30.

Also, the bridge application 24 transfers the data, which is received from the non-volatile memory 10 through the memory controller 30 and the host driver 27, to the host 100 through the SD device driver 25.
Alternatively, the bridge application 24 performs protocol conversion of the data into digital information (protocol conversion layer) and supplies the digital information to the object conversion module 23. The object conversion module 23 performs protocol conversion of digital information (protocol conversion layer) into digital information (connection layer packet) and supplies the converted information to the connection layer module 22. The connection layer module 22 performs protocol conversion of digital information (connection layer packet) into digital information (physical layer packet) and supplies the converted information to the TransferJet module 42.

Next, with reference to FIG. 1, a use case of the memory system 1 will be described with a case, in which the host 100, the memory system 1, and the correspondent device 200 are respectively a digital camera, a memory card, and a smartphone, as an example.

The memory system 1 is inserted into the card slot of the host 100 and a power supply of the host 100 is turned on. According to an instruction received from a user through a user interface 102 (such as shutter button or touch panel), the controller 101 of the host 100 images an object and generates an image (still image or dynamic image) file. The controller 101 writes the generated image file into the non-volatile memory 10 through the host interface 103, the bridge controller 20, and the memory controller 30. Similarly, the non-volatile memory 10 stores a plurality of image files 10b-1 to 10b-n (n is integer equal to or larger than 2). Each of the image files 10b-1 to 10b-n has an extension corresponding to a format of the image file.

Also, the controller 101 generates, as file time information 10c, information of time at which each of the image files 10b-1 to 10b-n is generated and writes the generated file time information 10c into the non-volatile memory 10 through the host interface 103, the bridge controller 20, and the memory controller 30.

A power supply of the correspondent device 200 is turned on and a TransferJet™ application (not illustrated) is activated and brought into a reception mode in the correspondent device 200. When the coupler 41 of the memory system 1 is brought closer, within a predetermined proximity distance, to the coupler 203 of the correspondent device 200 and detects the correspondent device 200, the memory system 1 establishes communication connection with the correspondent device 200. Also, the memory system 1 interprets that being brought closer to the correspondent device 200 is a transmission request. According to the transmission request, the memory system 1 creates, as a transmission list 29b, a list of image files to be transmitted to the correspondent device 200 among the plurality of image files 10b-1 to 10b-n.

Here, according to a predetermined rule, the memory system 1 creates, as the transmission list 29b, a list of image files transmitted to the correspondent device 200. For example, the memory system 1 generates time stamp information 28d including time information of the last image file transmitted in a previous transmission and stores the generated information in the NVRAM 28. Then, based on the file time information 10c and the time stamp information 28d, the memory system 1 can specify an image file which is not transmitted yet. The memory system 1 can create the transmission list 29b by adding the image file, which is not transmitted yet, to the transmission list 29b.

The memory system 1 stores the created transmission list 29b into the RAM 29. According to the transmission list 29b, the memory system 1 reads an image file from the non-volatile memory 10 and transmits data (copy of image file) of the read image file to the correspondent device 200.

Here, depending on a specification of the correspondent device 200, there is a case where an extension of the image file transmitted to the correspondent device 200 cannot be recognized by the correspondent device 200. When data of the extension unrecognizable by the correspondent device 200 is received, an error (reception error) is likely to be caused in reception processing of restoring the data in the correspondent device 200. Also, in the correspondent device 200, a file itself which causes a reception error may be accumulated as a file (trash file), existence of which cannot be recognized, in an inerasable state in the correspondent device 200.

Thus, in the first embodiment, the memory system 1 specifies, based on device information related to an attribution of the correspondent device 200, an extension recognizable in the correspondent device 200 and/or an extension unrecognizable therein. Filtering processing in which a file with the recognizable extension is selectively transmitted and a file with the unrecognizable extension is not transmitted is performed according to the specified result, whereby transmission of an inappropriate file to the correspondent device 200 is reduced.

Figure 3:
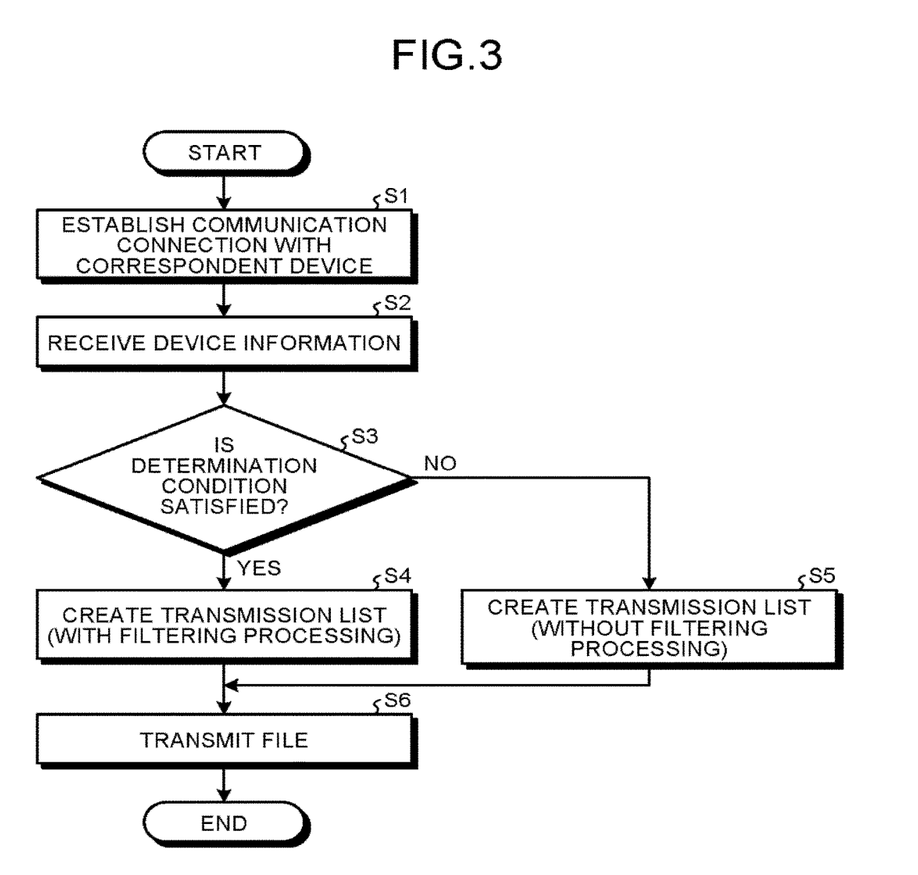
FIG. 3 is a flowchart illustrating an operation of the memory system according to the first embodiment.
Figure 4:
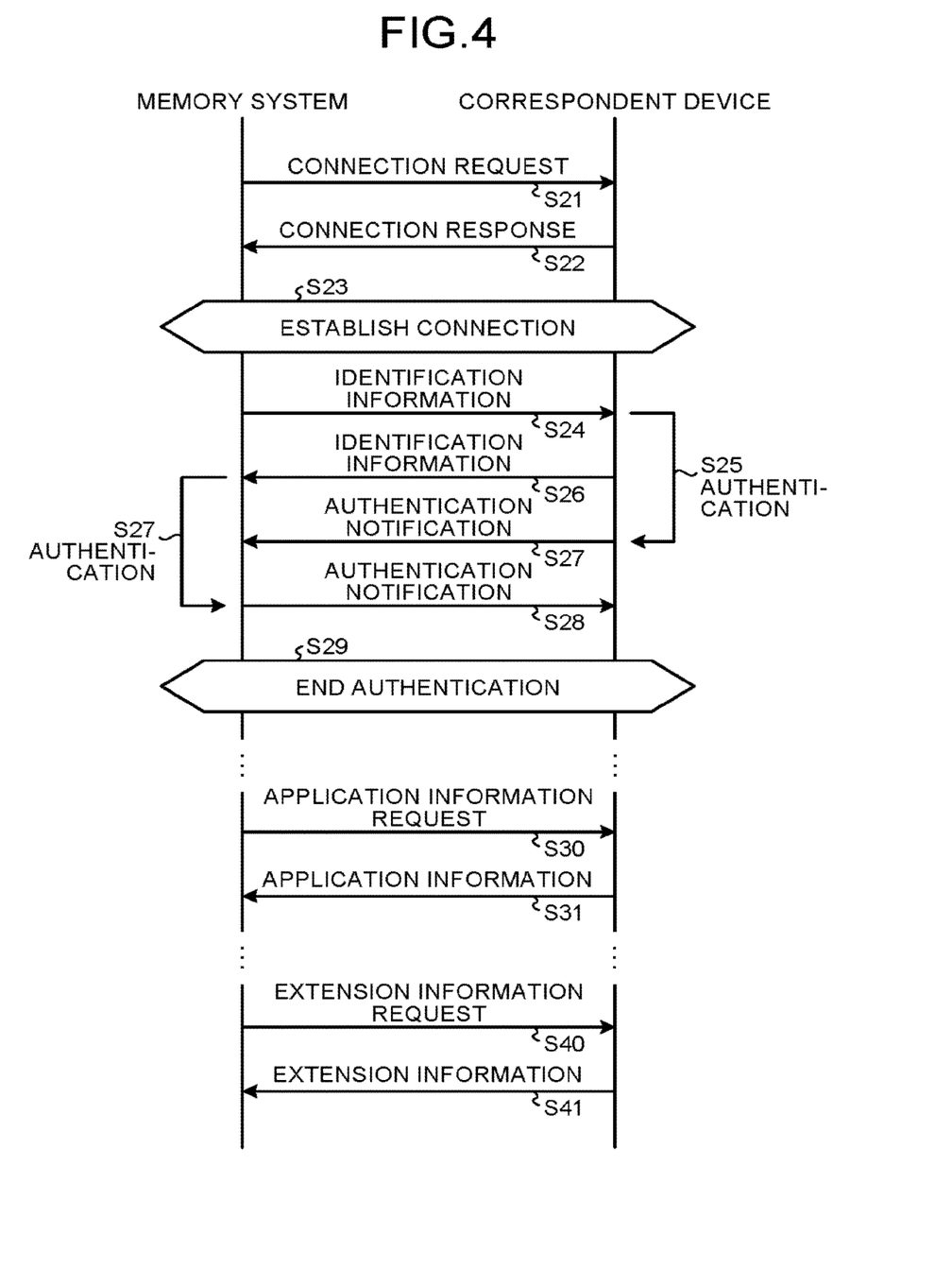
FIG. 4 is a sequence diagram illustrating the operation of the memory system according to the first embodiment.

More specifically, the memory system 1 performs an operation such as what is illustrated in FIG. 3 and FIG. 4. FIG. 3 is a flowchart illustrating an operation of the memory system 1. FIG. 4 is a sequence diagram illustrating the operation of the memory system 1.

The memory system 1 is inserted into the card slot of the host 100 and a power supply of the host 100 is turned on. A power supply of the correspondent device 200 is turned on and a TransferJet™ application (not illustrated) is activated in the correspondent device 200. When the coupler 41 of the memory system 1 is brought closer, within a predetermined proximity distance, to the coupler 203 of the correspondent device 200 and detects the correspondent device 200, the memory system 1 establishes communication connection with the correspondent device 200 (S1).

For example, as illustrated in FIG. 4, after the power supply of the host 100 is turned on, the memory system 1 periodically transmits a connection request from the coupler 41 (S21). When the coupler 41 of the memory system 1 is brought closer, within a predetermined proximity distance, to the coupler 203 of the correspondent device 200, the correspondent device 200 can receive the connection request with the coupler 203 and can transmit, to the memory system 1, a connection response indicating that the connection request is approved (S22). By receiving the connection response, the memory system 1 can detect that the correspondent device 200 is brought closer and is in a predetermined proximity distance. Accordingly, the memory system 1 and the correspondent device 200 can establish communication connection with each other in a physical layer and a connection layer (S23).

Then, as illustrated in FIG. 3, the memory system 1 receives device information related to an attribution of the correspondent device 200 from the correspondent device 200 (S2). Based on the received device information, the memory system 1 specifies an extension recognizable in the correspondent device 200 and/or an extension unrecognizable therein. That is, based on the received device information, the memory system 1 determines whether a determination condition indicating that there is an extension unrecognizable in the correspondent device 200 is satisfied (S3).

For example, as illustrated in FIG. 4, after the communication connection is established (S23), the memory system 1 and the correspondent device 200 exchange identification information with each other (S24 and S26) and perform authentication (S25 and S27). When the authentication is performed successfully, the memory system 1 and the correspondent device 200 exchange authentication notification, which indicates that the authentication is successful, with each other (S27 and S28) and the authentication is ended (S29).

Here, the identification information, which is received by the memory system 1 from the correspondent device 200, includes a vendor ID and a product ID of the correspondent device 200. The vendor ID and the product ID indicate that a vendor and a kind of a product. Thus, the vendor ID and the product ID can be used as information to specify a kind of the correspondent device 200.

Here, in a case where it has been known that a specific extension (such as extension indicating RAW data) is unrecognizable when a kind of the correspondent device 200 is a first kind, a vendor ID=ID1 or ID2 and a product ID=ID3 corresponding to the first kind are previously specified. That is, the vendor ID and the product ID can be used as device information to specify an extension recognizable in the correspondent device 200 and/or an extension unrecognizable therein.

For example, the memory system 1 can use the vendor ID and the product ID as a determination condition. In a case of (vendor ID, product ID)=(ID1, ID3) or (vendor ID, product ID)=(ID2, ID3), the memory system 1 determines that the determination condition is satisfied ("Yes" in S3), performs filtering processing, and creates the transmission list 29b (S4).

The memory system 1 lists image files (such as image file not transmitted yet) to be transmitted to the correspondent device 200 among the plurality of image files 10b-1 to 10b-n. The memory system 1 selectively adds, to the transmission list 29b, an image file having a recognizable extension "JPG," "MP4," "M4V," "MOV," "JPEG," "TIF," "TIFF," "BMP," "GIF," "PNG," "3GP," or "VCF" from among the listed image files and creates the transmission list 29b.

In a case other than (vendor ID, product ID)=(ID1, ID3) or (vendor ID, product ID)=(ID2, ID3), the memory system 1 determines that the determination condition is not satisfied ("No" in S3) and creates the transmission list 29b without performing the filtering processing (S5).

The memory system 1 lists image files (such as image file not transmitted yet) to be transmitted to the correspondent device 200 among the plurality of image files 10b-1 to 10b-n. The memory system 1 adds all of the listed image files to the transmission list 29b and creates the transmission list 29b. Note that, although an image file having an extension indicating management information or an extension indicating a thumbnail image can be recognized in the correspondent device 200, because it is not convenient in the correspondent device 200, it may be excluded from an object to be added to the transmission list 29b.

Alternatively, for example, the memory system 1 can use a kind itself of the correspondent device 200 as a determination condition. The memory system 1 specifies a kind of the correspondent device 200 based on a vendor ID and a product ID included in the identification information received from the correspondent device 200. When the specified kind of the correspondent device 200 is a first kind, the memory system 1 determines that the determination condition is satisfied ("Yes" in S3), performs the filtering processing, and creates the transmission list 29b (S4).

When the specified kind of the correspondent device 200 is a different kind (such as second kind), the memory system 1 determines that the determination condition is not satisfied ("No" in S3) and creates the transmission list 29b without performing the filtering processing (S5).

Alternatively, for example, the memory system 1 can use, as a determination condition, the OS 202a (see FIG. 1) mounted in the correspondent device 200. The memory system 1 specifies the OS 202a mounted in the correspondent device 200 based on a vendor ID and a product ID included in the identification information received from the correspondent device 200. When the specified OS 202a is a first OS, the memory system 1 determines that the determination condition is satisfied ("Yes" in S3), performs filtering processing, and creates the transmission list 29b (S4). The first OS is an OS corresponding to the first kind.

When the specified OS 202a is a different OS (such as second OS), the memory system 1 determines that the determination condition is not satisfied ("No" in S3) and creates the transmission list 29b without performing the filtering processing (S5).

Alternatively, for example, the memory system 1 can use, as a determination condition, a combination of the OS 202a and the application software 202b (see FIG. 1) mounted in the correspondent device 200. It is assumed that the following has been already known. That is, the first OS cannot recognize a certain extension (such as extension indicating RAW data) when first application software is not installed but the first OS can recognize the certain extension (such as extension indicating RAW data) when the first application software is installed.

For example, it is difficult for the memory system 1 to specify the application software 202b, which is mounted in the correspondent device 200, based on the vendor ID and the product ID. Thus, as illustrated in FIG. 4, the memory system 1 transmits an application information request to the correspondent device 200 (S30) and receives the application information from the correspondent device 200 (S31). The memory system 1 can specify the application software 202b, which is mounted in the correspondent device 200, based on the received application information.

In a case of (OS 202a, application software 202b)=(first OS, application software other than first application software), the memory system 1 determines that the determination condition is satisfied ("Yes" in S3), performs filtering processing, and creates the transmission list 29b (S4).

In a case of (OS 202a, application software 202b)=(first OS, first application software) or (second OS, arbitrary application software), the memory system 1 determines that the determination condition is not satisfied ("No" in S3) and creates the transmission list 29b without performing the filtering processing (S5).

Alternatively, extension information indicating a recognizable extension and/or an unrecognizable extension may be used as device information to specify an extension recognizable in the correspondent device 200 and/or an extension unrecognizable therein. For example, as illustrated in FIG. 4, the memory system 1 transmits an extension information request to the correspondent device 200 (S40) and receives extension information from the correspondent device 200 (S41). The memory system 1 checks contents of the received extension information. When determining that an unrecognizable extension does not exist substantially, the memory system 1 erases the extension information and ends the checking. When determining that there is an unrecognizable extension, the memory system 1 keeps holding the extension information and ends the checking.

After the checking is ended, when there is extension information, the memory system 1 determines that the determination condition is satisfied ("Yes" in S3), performs the filtering processing, and creates the transmission list 29b (S4).

The memory system 1 lists image files (such as image file not transmitted yet) to be transmitted to the correspondent device 200 among the plurality of image files 10b-1 to 10b-n. When a recognizable extension is described in the extension information, the memory system 1 selectively adds image files, each of which includes the recognizable extension described in the extension information, among the listed image files to the transmission list 29b and creates the transmission list 29b. When an unrecognizable extension is described in the extension information, the memory system 1 selectively adds an image file other than an image file, which includes the unrecognizable extension described in the extension information, among the listed image files to the transmission list 29b and creates the transmission list 29b.

After the checking is ended, when there is no extension information, the memory system 1 determines that the determination condition is not satisfied ("No" in S3) and creates the transmission list 29b without performing the filtering processing (S5).

Then, according to the transmission list 29b, the memory system 1 reads an image file from the non-volatile memory 10 and transmits data (copy of image file) of the read image file to the correspondent device 200 (S6). Accordingly, it is possible to reduce transmission of an image file unrecognizable in the correspondent device 200 to the correspondent device 200. Also, it is possible to reduce an error display due to unsuccessful recognition in the correspondent device 200 and to reduce accumulation of a trash file in the correspondent device 200.

As described above, in the first embodiment, based on device information related to an attribution of the correspondent device 200, the memory system 1 specifies an extension recognizable in the correspondent device 200 and/or an extension unrecognizable therein. Then, filtering processing in which a file with a recognizable extension is selectively transmitted and a file with an unrecognizable extension is not transmitted is performed according to the specified result. Accordingly, it is possible to reduce transmission of an inappropriate file to the correspondent device 200.

Also, in the first embodiment, when a determination condition indicating that there is an extension unrecognizable in the correspondent device 200 is satisfied based on device information, the memory system 1 performs the filtering processing. When the determination condition is not satisfied, the memory system 1 does not perform the filtering processing. Accordingly, it is possible to reduce transmission of an inappropriate file to the correspondent device 200 while securing convenience for a user as much as possible.

Second Embodiment

Next, a memory system 1 according to the second embodiment will be described. In the following, a part different from the first embodiment will be mainly described.

In the first embodiment, the memory system 1 interprets that being brought closer to the correspondent device 200 is a transmission request. Then, according to the transmission request, the memory system 1 selects an image file to be transmitted to the correspondent device 200 based on a predetermined rule and transmits the file to the correspondent device 200.

However, there is a case where a user intends to transmit a part of all image files, which satisfy the predetermined rule, to the correspondent device 200. Never the less, when all image files which satisfy the predetermined rule are transmitted from the memory system 1 to the correspondent device 200, for example, in a case where there is a great number of image files or where a data size is large, transmission processing time tends to be longer uselessly and convenience for a user may be significantly decreased.

Also, there is a case where a user intends to transmit an image file (such as already-transmitted image file), which does not satisfy a predetermined rule, to the correspondent device 200. In this case, when an intension of the user cannot be satisfied, convenience for the user may be significantly decreased.

Since the memory system 1 (such as memory card) does not include a user interface, contraption is necessary to select predetermined image data from the plurality of image files 10b-i to 10b-n recorded in the non-volatile memory 10 and to transmit the selected data to the correspondent device 200.

On the other hand, when image data is not transmitted to the correspondent device 200 uniformly unless the image data is selected, a user who does not intend to select an image file may be forced to perform selection operation of an image file, whereby convenience for the user may be significantly decreased.

Thus, in the second embodiment, a file which is originally generated in a host 100 for print reservation of an image file is used as information (transmission instruction file) to select an image file to be transmitted to a correspondent device 200 and a memory system 1 receives the transmission instruction file from the host 100 when the reception is intended by a user. Then, the memory system 1 determines whether there is intension of the user according to an existence of the transmission instruction file in the memory system 1.

Figure 5:
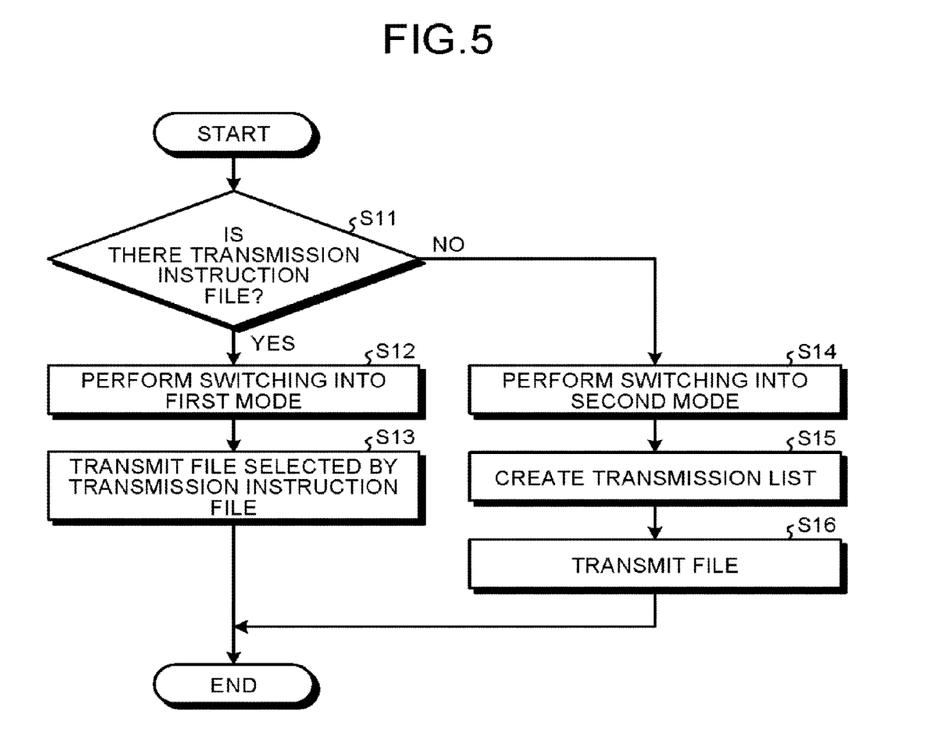
FIG. 5 is a flowchart illustrating an operation of a memory system according to a second embodiment.
Figure 6:
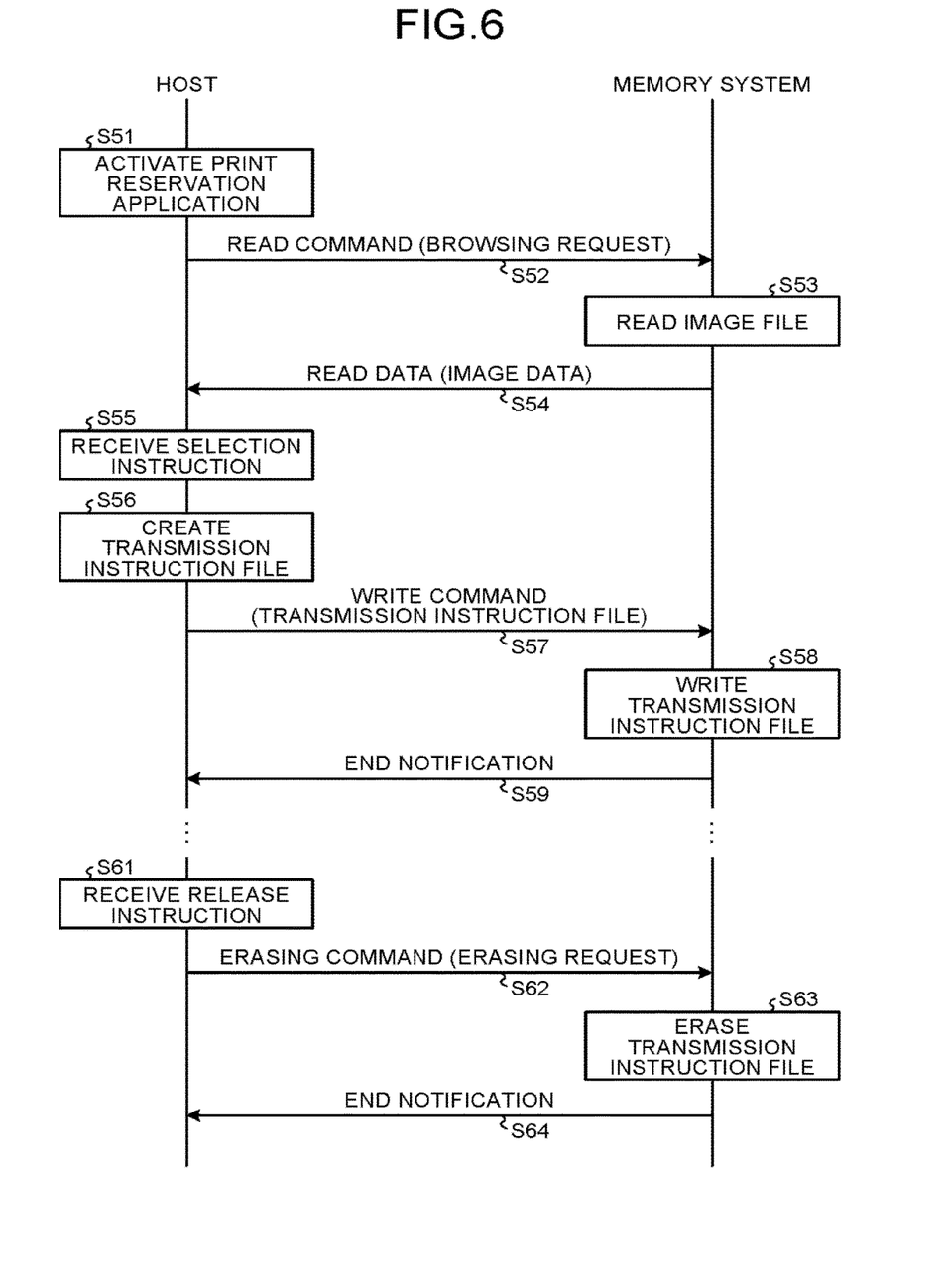
FIG. 6 is a sequence diagram illustrating the operation of the memory system according to the second embodiment.

More specifically, the memory system 1 performs an operation such as what is illustrated in FIG. 5 and FIG. 6. FIG. 5 is a flowchart illustrating an operation of the memory system 1. FIG. 6 is a sequence diagram illustrating the operation of the memory system 1.

A bridge controller 20 of the memory system 1 determines whether there is a transmission instruction file 10a in a non-volatile memory 10 (S11).

For example, in an initial state, in the memory system 1, there is no transmission instruction file 10a in the non-volatile memory 10.

Alternatively, for example, as illustrated in FIG. 6, when receiving an activation instruction of a print reservation application through a user interface 102, a controller 101 of the host 100 activates the print reservation application and displays a print reservation screen on the display (S51). Also, the controller 101 generates a read command including a browsing request of an image file and transmits the read command to the bridge controller 20 in the memory system 1 through the host interface 103 (S52).

According to the read command, the bridge controller 20 of the memory system 1 reads data (image data) of an image file from the non-volatile memory 10 through the memory controller 30 (S53) and transmits read data including the read image data back to the host 100 (S54).

Based on the image data received from the memory system 1, the controller 101 of the host 100 displays a thumbnail image and a checkbox on the print reservation screen. For example, the controller 101 of the host 100 receives a check in the checkbox as a selection instruction through the user interface 102 (S55) and creates a transmission instruction file including an instruction to print a selected file (S56). The controller 101 generates a write command including a transmission instruction file and transmits the generated command to the bridge controller 20 of the memory system 1 through the host interface 103 (S57).

According to a write command, the bridge controller 20 of the memory system 1 writes the transmission instruction file 10a into the non-volatile memory 10 through the memory controller 30 (S58) and transmits, back to the host 100, a notification indicating that the write processing is ended (S59). Accordingly, in the memory system 1, there is the transmission instruction file 10a in the non-volatile memory 10.

Alternatively, for example, as illustrated in FIG. 6, when receiving a selection release instruction to uncheck all checks in checkboxes through the user interface 102 (S61), the controller 101 of the host 100 generates an erasing command including an erasing request of the transmission instruction file and transmits the command to the bridge controller 20 of the memory system 1 through the host interface 103 (S62).

According to the erasing command, the bridge controller 20 of the memory system 1 erases the transmission instruction file 10a in the non-volatile memory 10 through the memory controller 30 (S63) and transmits the notification indicating that the erase processing is ended to the host 100 (S64). Accordingly, in the memory system 1, there is no transmission instruction file 10a in the non-volatile memory 10.

Referring back to FIG. 5, when there is the transmission instruction file 10a in the non-volatile memory 10 ("Yes" in S11), the bridge controller 20 of the memory system 1 switches an operation mode into a first mode (S12) and reads an image file from the non-volatile memory 10 according to the transmission instruction file 10a. That is, in the first mode, the bridge controller 20 interprets that information of an image file, which is selected by the transmission instruction file 10a, as information of an image file to be transmitted to the correspondent device 200 and reads the image file described in the transmission instruction file 10a from the non-volatile memory 10. The bridge controller 20 transmits data (copy of image file) of the read image file to the correspondent device 200 (S13).

When there is no transmission instruction file 10a in the non-volatile memory 10 ("No" in S11), the bridge controller 20 of the memory system 1 switches an operation mode into a second mode (S14) and creates, as the transmission list 29b, a list of image files to be transmitted to the correspondent device 200 according to a predetermined rule (such as image file not transmitted yet) (S15). According to the transmission list 29b, the memory system 1 reads an image file from the non-volatile memory 10 and transmits data (copy of image file) of the read image file to the correspondent device 200 (S16).

As described above, in the second embodiment, in the memory system 1, when there is the transmission instruction file 10a, the bridge controller 20 transmits a file selected by the transmission instruction file 10a to the correspondent device and when there is no transmission instruction file 10a, the bridge controller 20 selects an image file to be transmitted to the correspondent device 200 according to a predetermined rule and transmits the selected file to the correspondent device 200. Accordingly, in each of cases where selection of an image file is intended and not intended, convenience for a user can be improved.

Note that when there is a transmission instruction file, the bridge controller 20 may repeatedly perform the operation in S13 in FIG. 5. For example, when transmission of an image file selected by the transmission instruction file 10a to the correspondent device 200 (S13) is ended, the memory system 1 turns off the transmission function in S13. Then, when a power supply of the host 100 is restarted, a power supply of the memory system 1 is also restarted. Alternatively, when a command to instruct restart of a power supply is transmitted from the host 100, a power supply of the memory system 1 is restarted according to the command. According to the restart of the power supply of the memory system 1, the memory system 1 recovers a state in which an image file selected by the transmission instruction file 10a can be transmitted to the correspondent device 200. That is, the memory system 1 turns of the transmission function in S13. Then, the memory system 1 interprets that being brought closer to the correspondent device 200 is a transmission request and transmits an image file selected by the transmission instruction file 10a to the correspondent device 200 again according to the transmission request (S13).

Note that a file format of the transmission instruction file may be, for example, a file format prescribed in a DPOF or a file format prescribed in an SDA. Also, the transmission instruction file may be the file list 28c written into the non-volatile RAM (NVRAM) 28.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a proximity wireless interface that can communicate with a correspondent device;
   a memory in which a file having an extension is stored; and
   a controller that specifies, if device information related to an attribution of the correspondent device is received in the proximity wireless interface from the correspondent device, at least one of an extension recognizable in the correspondent device and an extension unrecognizable therein based on the device information and that performs first transmission control according to a specified result,
   the first transmission control including at least one of selectively transmitting a file having the recognizable extension from the proximity wireless interface to the correspondent device and not transmitting a file having the unrecognizable extension from the proximity wireless interface to the correspondent device.

2. The memory system according to claim 1, wherein the device information includes first information to identify a kind of the correspondent device, and
   the controller specifies a kind of the correspondent device based on the first information and specifies at least one of the extension recognizable in the correspondent device and the extension unrecognizable therein according to the specified kind of the correspondent device.

3. The memory system according to claim 2, wherein if the kind of the correspondent device is a first kind, the controller performs the first transmission control and, if the kind of the correspondent device is a second kind, the controller does not perform the first transmission control.

4. The memory system according to claim 2, wherein the first information includes identification information to authenticate the correspondent device, and
   the controller specifies a kind of the correspondent device based on the identification information.

5. The memory system according to claim 4, wherein the identification information includes a vendor ID and a product ID, and
   the controller specifies a kind of the correspondent device based on the vendor ID and the product ID.

6. The memory system according to claim 2, wherein the controller specifies an operating system (OS), which is mounted in the correspondent device, based on the first information and specifies at least one of the extension recognizable in the correspondent device and the extension unrecognizable therein according to the specified OS.

7. The memory system according to claim 6, wherein if the OS mounted in the correspondent device is a first OS, the controller performs the first transmission control and, if the OS mounted in the correspondent device is a second OS, the controller does not perform the first transmission control.

8. The memory system according to claim 6, wherein the device information further includes second information indicating an application software mounted in the correspondent device, and
   the controller specifies an application software, which is mounted in the correspondent device, based on the second information and specifies at least one of the extension recognizable in the correspondent device and the extension unrecognizable therein according to a combination of the OS and the application software which are mounted in the correspondent device.

9. The memory system according to claim 6, wherein if the combination of the OS and the application software which are mounted in the correspondent device is a first combination, the controller performs the first transmission control and, if the combination of the OS and the application software which are mounted in the correspondent device is a second combination, the controller does not perform the first transmission control.

10. The memory system according to claim 1, wherein the device information includes third information indicating at least one of an extension recognizable in the correspondent device and an extension unrecognizable therein, and
    the controller specifies at least one of the extension recognizable in the correspondent device and the extension unrecognizable therein based on the third information.

11. The memory system according to claim 10, wherein if there is the third information, the controller performs the first transmission control and, if there is not the third information, the controller does not perform the first transmission control.

12. The memory system according to claim 1, wherein the proximity wireless interface includes a coupler to be electromagnetically coupled to a coupler of the correspondent device.

* * * * *